May 12, 1970 D. W. HOLMES 3,511,933

AUTOMATIC TELEPHONE ALARM SYSTEM

Filed April 10, 1967

INVENTOR.
DEWEY W. HOLMES
BY *Dominik, Stein & Knechtel*
ATTY'S.

United States Patent Office 3,511,933
Patented May 12, 1970

3,511,933

AUTOMATIC TELEPHONE ALARM SYSTEM

Dewey W. Holmes, Lakeland, Fla., assignor of one-half to Joseph P. Bates, Plant City, Fla.

Filed Apr. 10, 1967, Ser. No. 629,734
Int. Cl. H04m *11/04*
U.S. Cl. 179—5 8 Claims

ABSTRACT OF THE DISCLOSURE

An automatic warning device for notifying one or more persons, by telephone, of the existence of a predetermined condition including, generally, a tape recorder and associated electrical circuitry for automatically energizing it. When the warning device is activated, the telephone line is automatically seized and the output of the tape recorder is coupled to the telephone line, by means of a standard inductance coil. The tape recorder is adapted to operate a dialing mechanism by means of conductive strips on the tape to dial one or more called stations and to transmit the recorded message to that station. After the recorded message, the warning device automatically disconnects from the telephone line and then thereafter automatically again seizes the telephone line to call the same or another telephone number.

This invention relates, in general, to warning devices and, in particular, to automatic warning devices for notifying one or more persons, by telephone, of a fire, a theft or other condition.

Presently, there are numerous warning devices available for notifying an appointed person, by telephone, of an emergency or other condition. Each of these warning devices, however, generally are objectionable, for one reason or another. For example, most of these warning devices are adapted to dial only one number and, accordingly, have a limited application. Most of the same warning devices, and many others, employ an endless magnetic tape. The number of recorded messages, and their duration, are therefore limited. A time limit of three minutes is generally standard and then the warning device automatically cuts off, or alternatively, the message is repeated until the called party hangs up. Since an endless magnetic tape is used, the warning device cannot be timed, that is, it cannot be programmed to indicate to the called party how long ago the warning device had been activated. Still others of the available warning devices can be easily jammed, with telephone systems of the so-called calling party release type.

The warning device of the present invention overcomes each of the above-mentioned disadvantages of the presently available warning devices. The warning device includes, generally, a tape recorder and associated electrical circuitry for automatically energizing it. When the warning device is activated, the telephone line is automatically seized and the output of the tape recorder is coupled to the telephone line, by means of a standard inductance coil. The tape recorder or, more specifically, its magnetic tape, is adapted to operate a dialing mechanism to dial one or more called stations and to transmit the recorded message to that station. After the recorded message, the warning device automatically disconnects from the telephone line and then thereafter automatically again seizes the telephone line to call the same or another telephone number.

Accordingly, it is an object of the present invention to provide improved warning devices and, in particular, improved automatic warning devices for notifying one or more persons, by telephone, of an emergency condition.

Another object is to provide improved warning devices of the described type which can be easily installed and connected to the telephone line.

Still another object is to provide improved warning devices of the described type which cannot be jammed, when used in telephone systems of the so-called calling party release type.

A still further object is to provide improved warning devices of the described type which can be easily adapted to dial one or more telephone numbers and to transmit a recorded message to the called party.

Still another object is to provide improved telephone warning devices which can be normally energized from the 110 volt source normally found in most homes and offices and which include an emergency source of power which is automatically connected into the system in the event of a power failure.

Still another object is to provide improved telephone warning devices which can be programmed to indicate to the called party the time which has elapsed since the device was activated.

A still further object is to provide improved telephone warning devices which are relatively simple in construction in comparison to existing telephone warning devices.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings in which.

Similar reference characters refer to similar parts throughout the several views of the drawings.

Figure 1:
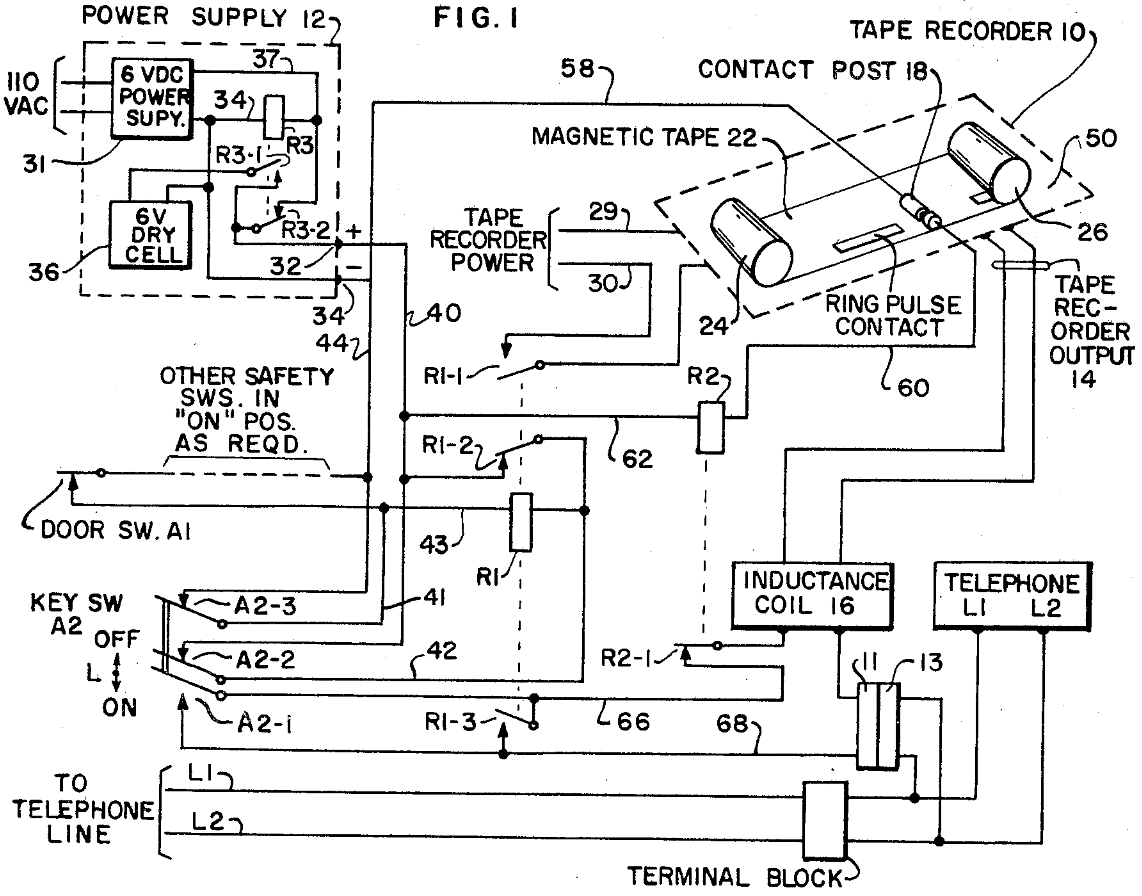
FIG. 1 is a schematic diagram of the warning device of the present invention.
Figure 2:
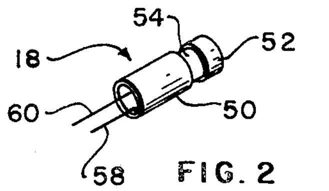
FIG. 2 is a perspective view of the contact post.

Referring now to the drawing, in FIG. 1 the warning device is generally illustrated schematically and can be seen to include a tape recorder 10, a power supply 12 and related circuitry including a number of relays R1, R2, and R3 and switches A1, A, . . . for operating it, in the manner described below. The warning device can be built as a unit, installed and connected to the telephone line in the same fashion as an extension telephone, by inserting a plug 11 into an ordinary telephone extension outlet 13. A number of detection switches, such as the door switch A1, are connected in series and installed at each door, window or the like so as to be activated to detect an illegal entry and to activate the warning device. A main switch which can be a key switch A2 advantageously is provided to control the operation of the warning device, and to prevent the warning device from being jammed, as described more fully below.

More specifically, the tape recorder 10 may be any standard, commercially available tape recorder, modified by coupling its output 14 to an inductance coil 16, described more fully below, and by mounting a contact post 18, also described more fully below, on its top deck 20 so as to be slidably engaged by the magnetic tape 22 as the latter is advanced from a supply reel 24 and wound on a takeup reel 26.

The power supply 12 for the warning device normally is coupled to the 110 volt source generally found in most homes and offices, and has an AC-DC convertor 31 for converting 110 volts to a 6 volt direct current output, at the output terminals 32 and 34. The power supply 12 also includes a 6 volt battery or power pack 36, which is automatically coupled to the output terminals 32 and 34 in the event of power failure, so that the warning device remains operative. A relay R3 is serially connected, by means of conductors 37 and 38, with the output terminals of the convertor 31 so as to be normally energized as long as 110 volt source is operatively coupled to the power supply 12. The output terminals of the battery 36 are coupled to the output terminals 32 and 34, through a contact R3–1 of the relay R3 which is opened when relay R3 is energized so as to normally disconnect the battery 36 from the output terminals 32 and 34. If the 110 volt source is disconnected from the power supply 12, or is inoperative, relay R3 restores thereby closing its contact R3–1 to couple the battery 36 to the output terminals 32 and 34. A contact R3–2 is serially included in the conductor 37 connected to the output terminal 32, and opens when relay R3 is deenergized so as to prevent relay R3 from being operated by the battery 36.

The tape recorder 10 has a source of power (not shown) which can be similar to the power supply 12 coupled to it, by means of a pair of conductors 29 and 30. The conductor 30 has a contact R1–1 of a relay R1 serially included in it, for controlling the supply of power to the tape recorder 10.

The output terminals 32 and 34 of the power supply 12 are coupled to the relay R1 by means of a conductor 40, a contact A2–2 of the key switch A2, a conductor 42 connected to one terminal of the relay's winding (not shown), a conductor 43 connected to the other terminal of the relay's winding, a conductor 41, a contact A2–3 of the key switch A2 and a conductor 44. The detection switches, such as the door switch A1 are connected across the conductors 41 and 44 so as to provide another energizing circuit for the relay R1. Relay R1 also has a contact R1–2 which is connected so as to form a holding circuit to normally maintain relay R1 energized, by means of current flow from the positive terminal 32, conductor 40, contact R1–2, the relay winding, conductor 43, door switch A1, and conductor 44 to the negative terminal 34. Accordingly, relay R1 is held operated through its own contact R1–2 whenever the key switch A2 is in an off position, and is further held operated with the key switch A2 in an on position so long as the door switch A1 and its holding contact R1–2 are closed.

Contact R1–1 is normally opened when the relay R1 is energized so as to disconnect the source of power from the tape recorder 10 thereby rendering it inoperative. When the relay R1 is de-energized, for example, when the door switch A1 is opened with the warning device in an activated state, contact R1–1 closes to couple the source of power to the tape recorder 10 to energize it.

Figure 3:
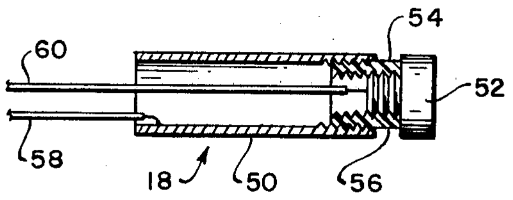
FIG. 3 is a sectional view of the contact post.

The contact post 18, as can be best seen in FIG. 3, has a body contact 50, a tip contact 52 and a tubular threaded insulating spacer 54. The spacer 54 is threaded into the body contact 50, and the tip contact 52 is threaded into the spacer and retained in spaced relation so as to provide a contact gap 56 between the body contact 50 and the tip contact 52. The spacer 54 may be formed of any suitable electrical insulating material.

A conductor 58 is connected to the body contact 50, and to the output terminal 34 of the power supply 12. A conductor 60 is connected to the tip contact 52 and to one terminal of the winding (not shown) of a relay R2. The other terminal of the winding of relay R2 is connected, by a conductor 62 and the conductor 40 to the output terminal 32 of the power supply 12. It can therefore be seen that the relay R2 is connected in a series circuit with the power supply 12 and the contact post 18, and is energized whenever the contact gap 56 of the contact post 18 is closed.

Contact R2–1 of relay R2 is connected in series with conductors 66 and 68 which are, in turn, coupled to the telephone line via the plug 11 and the telephone extension plug 13. Relay R2 functions as a dialing relay to dial a called telephone number by opening its contact R2–1 in the manner described below.

Figure 4:
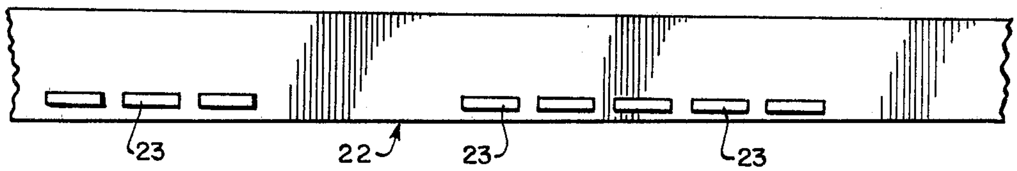
FIG. 4 is a partial top plan view of the magnetic tape, illustrating the magnetic strips placed on it for dialing.
Figure 5:
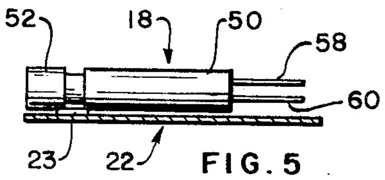
FIG. 5 is a view illustrating the manner in which the metallic strips on the magnetic tape close the contact gap of the contact post, to activate the dialing mechanism of the warning device.

The magnetic tape 22, as can be best seen in FIG. 4, has a number of metallic strips 23 affixed to it, in predetermined spaced relation. When the tape recorder 10 is energized, the magnetic tape 22 is advanced and moves against the contact post 18. The magnetic tape 22 and the contact post 18 are positioned so that the metallic strips 23 bridge the contact gap 56 to thereby couple the body contact 50 and the tip contact 52 together to complete the above-described series circuit to energize relay R2. When relay R2 operates, its contact R2–1 opens to simulate the operation of a telephone's dial contact in dialing a telephone number. In an operative model, the metallic strips 23 are $\frac{7}{32}$ of an inch long and spaced $\frac{5}{32}$ of an inch apart on the magnetic tape so as to break the telephone line each $\frac{1}{10}$ of a second, in the same manner as the telephone line is broken with the dial contacts during the dialing operation. Between each digit, there is a space of two inches. In other words, in dialing the two digits 5 and 3, as illustrated in FIG. 4, to dial the digit 5, five metallic strips 23 each $\frac{7}{32}$ of an inch long is affixed to the magnetic tape, $\frac{5}{32}$ of an inch apart. For the digit 3, three metallic strips each $\frac{7}{32}$ of an inch long and spaced $\frac{5}{32}$ of an inch apart are affixed to the magnetic tape. Between the last metallic strip for the digit 5 and the first metallic strip for the digit 3, a space of two inches is provided. Accordingly, by positioning the metallic strips 23 on the magnetic tape 22 in the described manner, any telephone number can be dialed.

Several seconds interval is provided on the magnetic tape 22 for the called party to answer, and the message to be given is then recorded. A metallic strip 23 is then placed on the magnetic tape to disconnect the warning device. A metallic strip one inch long has been found satisfactory for this purpose.

It may be noted that since a regular magnetic tape 22 is used, the length of the message is not limited to one to three minutes, as it normally is when an endless magnetic tape is used. More importantly, with this arrangement, a number of different people can be called and given a message, simply by placing additional metallic strips 23 on the magnetic tape 22 to dial each person's number. In other words, the magnetic tape 22 is divided into a number of segments, each of which includes a series of the metallic strips 23 for dialing a telephone number, the recorded message and the metallic strip 23 for disconnecting the warning device from the telephone line.

An arrangement of this type can be used advantageously in any situation where more than one party is to be notified of an emergency condition. For example, in cities having volunteer fire departments, the device can be manually or automatically activated to call each of the volunteer firemen to notify them of an alarm.

Another advantage of this arrangement is that the system can be programmed to indicate to the called party when the warning device was keyed or activated. For example, if a party is to be notified of a particular condition occurring, the warning device can be programmed to periodically call that party's telephone number and to indicate by the recorded message the period of time which has elapsed between the time the device was activated and is now being monitored. Accordingly, if the party is not available to answer the telephone until after the warning device has called him several times, when he does answer it, the party is advised of the lapse of time since the warning device was first activated. Such an arrangement can be beneficial in that the party being aware of how long the condition has existed can take whatever preliminary measures necessary to correct it.

To install the warning device, it is only necessary to affix a detection switch, such as the door switch A1, at each of the doors and windows which could be opened illegally for the purpose of burglarizing an establishment. These switches, as indicated in FIG. 1, each are connected in series with one another and between the conductor 44 and one terminal of the winding of relay R1. The key switch A2, which is advantageously a switch that can be operated with a key, is provided for controlling the operation of the warning device. More specifically, the key switch A2 has three contacts A2–1, A2–2 and A2–3. In the off position, the contacts A2–2 and A2–3 both are normally closed with the key switch A2 in the off position. The position output terminal 32 of the power supply 12 is coupled by the conductor 40, the contact A2–2, the conductor 42 to one terminal of the winding of relay R1, from the other terminal of the winding of relay R1 to the normally closed contact A2–3, the conductor 44, to the negative output terminal 34 of the power supply 12. Accordingly, with the key switch A2 in the off position, relay R1 is normally energized and at its contact R1–1 disconnects the source of power from the tape recorder and at its contact R1–2, closes the holding circuit for the relay R1. The warning device therefore is rendered inoperative, when the key switch A2 is in the off position, so that the doors and windows having the detection switches affixed to them can be opened and closed. It may be further noted that the warning device is coupled to the telephone line in the same manner as an extension telephone is coupled to a telephone line so that it does not interfere with the normal operation of the telephone 80.

To render the warning device operative, the key switch A2 is switched to the on position and at its contacts A2–2 and A2–3 the above-described energizing circuit for the relay R1 is opened. Relay R1, however, is held operated through its holding contact R1–2, as follows: from the positive output terminal 32 of the power supply 12, conductor 40, contact R1–2, the winding of relay R1, conductor 43, the normally closed door switch A1 and the other detection switches which may be connected in series with the door switch A1, conductor 44, to the negative output terminal 34 of the power supply 12.

Contact A2–1 of the key switch A2 is connected in series with the conductors 66 and 68 which are coupled by means of the plug 11 and the telephone extension plug 13 to the telephone lines L1 and L2, and simulates the operation of the hook switch contacts of a regular telephone. More specifically, contact A2–1 is open when the key switch A2 is in an off position and when the key switch is turned to the on position, the contact A2–1 closes to seize a telephone line in the same manner as a telephone line is seized when a telephone's handset is picked up thereby closing the telephone's hook switch contacts. This operation prevents jamming of the warning device, particularly when the warning device is used in a telephone system of the so-called calling party release type. In the past, with the presently available warning devices of the prior art, a person attempting to break into a building illegally would only have to go to the nearest public telephone, dial the telephone number of the telephone in the building and let the telephone ring. The telephone in the building would continue to ring until the warning system was keyed. The warning system in attempting to seize a telephone line and dial a party to warn them of the attempted illegal entry would only make connection with the number that had called. Accordingly, the warning system would be inoperative until the calling party hangs up the telephone.

With the arrangement of the present invention, when a place of business closes for the day or closes for the weekend, the warning device is activated simply by operating the key switch A2 to the on position. Contact A2–1 of the key switch A2 closes and seizes a telephone line, so that anyone attempting to call this number to jam the warning device would only receive a busy signal. Furthermore, since the warning device has already seized a telephone line, it will automatically dial the called party's telephone number. Accordingly, it cannot be jammed in the above-described manner.

When installed within a called party release type telephone stystem, the contact A2–1 of the key switch A2 preferably is rendered inoperative, simple by not connecting it into the circuitry, and is replaced by a contact R1–3 of the relay R1. The contact R1–3 is connected across the conductors 66 and 68 and functions to seize a telephone line in the above-described manner, whenever the warning device is activated. In other words, a telephone line is seized only after the warning device is activated. This arrangement is desirable in a called party release type telephone system, since first a warning tone is normally automatically coupled to the telephone line, whenever a telephone line has been sized and a number has not been dialed within a pre-established period of time. The warning tone is for the purpose of attracting attention to the fact that the telephone handset is off the receiver. If the party fails to dial or hang up the handset within a pre-established period of time thereafter, the telephone is rendered inoperative so as to release the telephone office equipment. A serviceman is then usually dispatched to check the equipment. It is therefore apparent that the telephone line could not be seized and held for an extended period of time.

With the warning device in an activated condition, the opening of the door switch A1 or any of the other detection switches in series with it will open the energizing circuit for the relay R1. Relay R1 will therefore restore and at its contact R1–1 will couple the source of power to the tape recorder 10 to energize it. If the contact R1–3 is connected into the circuitry in place of the contact A2–1 of the key switch A2, this contact R1–3 will close to seize a telephone line in the manner described above. Of course, if the contact A2–1 is coupled into the circuitry, the warning device has already seized a telephone line.

When the tape recorder 10 is energized, the magnetic tape 22 is advanced and the metallic strips 23 thereon slidably engage the contact post 18 and close the contact gap 56 between the body contact 50 and the tip contact 52. Each time the contact gap 56 is closed, relay R2 is energized and opens its contact R2–1. Contact R2–1 breaks the telephone line in the same manner as the dial contacts of a regular telephone dial when a number is dialed, to thereby transmit a dial pulse to the telephone office equipment. After the complete telephone number is dialed in the described manner, there is a delay on the magnetic tpae 22 to permit the called party time to answer the telephone and then the recorded message is transmitted.

It may be noted that the output 14 of the tape recorder 10 is coupled to the telphone lines L1 and L2, by an inductance coil 16 which can be a standard inductance coil of the type normally used by Western Electric in the telephone instruments it manufactures.

After the recorded message is transmitted, a metallic strip 23 which is approximately one inch in length engages the contact post 18 to thereby operate relay R2 to disconnect the warning device from the telephone line.

Any number of additional telephone numbers can be dialed by placing magnetic strips 23 on the magnetic tape 22, so that the same party or any number of other parties can be called and given a recorded message, limited only by the length of the magnetic tape 22 provided on the supply reel 24.

In the event there is a power failure, the relay R3 is released, and at its contacts R3–1 and R3–2 the battery 36 is automatically coupled to the output terminals 32 and 34 of the power suppy 12. Accordingly, the warning device is maintained in an operative condition.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting snese.

Now that the invention has been described, what is claimed as new and desired to be secured by Letters Patent is:

1. A warning device adapted to be coupled to a telephone line for automatically diaing a called party's telephone number and for transmitting a recorded message to that called party comprising, in combination:

(a) a power supply means for actuating said warning device;

(b) normally inactivated tape recorder means having an output, a magnetic tape having thereon the recorded message and a plurality of metallic strips suitably spaced to dial a predetermined number, and normally open contact means in series with said power supply means and slidably engaged with the magnetic tape to be closed when in contact with the metallic strips as the tape is advanced;

(c) detection switch means for detecting an abnormal condition such as an illegal entry, emergency condition and the like;

(d) a power supply relay in series with said power supply means and detection switch means operated when the abnormal condition is detected by the detection switch means, and said power supply relay having contacts disposed to activate said tape recorder means when said relay is operated;

(e) coupling means for coupling the output of said tape recorder directly to the telephone line to transmit the recorded message, said coupling means comprising a pair of conductors coupled to said telephone line and said tape recorder output;

(f) dialing relay means in series with said power supply means and said tape recorder contact means and energized when said contacts are closed;

(g) dialing means for dialing the predetermined number wherein the operative elements consist of said tape recorder means, an inductive coil, and a normally closed contact of said dialing relay in series with said coupling means, said dialing means operating such that when an abnormal condition is detected to activate the tape recorder, the dialing contact is opened each time the tape recorder contact means is closed to simulate the dial contact of a typically dial-type telephone, whereby after the number is dialed, the recorded message is transmitted.

2. The warning device of claim 1 further including telephone line seizing means to prevent incoming telephone calls when the device is being used.

3. The warning device of claim 2 wherein said telephone line seizing means comprises a manual key switch in series with said coupling means.

4. The warning device of claim 2 wherein said telephone line seizing means comprises a contact of said power supply relay which seizes the telephone line when said power supply relay is de-energized.

5. The warning device of claim 1 further including a by-pass switch means for by-passing said detection means and said by-pass switch means connected to maintain said power supply relay in an energized state and thereby render the device non-responsive to said detection means.

6. The warning device of claim 1 wherein said tape recorder contact means comprises a contact post having a body contact, a tip contact and an insulating spacer for affixing said tip contact to said body contact in spaced relation thereto to provide a contact gap, said metallic strip slidably engaging said body contact and said tip contact so as to close said contact gap to close said circuit.

7. The warning device of claim 1 wherein said source of power comprises a power supply having a pair of output terminals, an AC-DC convertor normally coupled to a 110 volt source of alternating power and to said output terminals, a third relay having a pair of contacts included in the coupler between said converter and said output terminals and normally energized thereby, a source of stored power coupled to said output terminals through said pair of contacts of said third relay when said third relay is de-energized, whereby said source of stored power is automatically coupled to said output terminals when said 110 volt source of alternating power is inoperable to energize said warning device.

8. The warning device of claim 1 further including a holding circuit to maintain said power supply relay in an energized condition comprising in series a power supply means, a holding contact of the power supply relay, the power supply relay, and the detection switch means.

References Cited

UNITED STATES PATENTS

| | | | |
|---|---|---|---|
| 2,827,515 | 3/1958 | Zuber | 179—5 |
| 3,274,346 | 9/1966 | Silber | 179—5 |
| 3,287,500 | 11/1966 | Moore | 179—5 |
| 3,381,092 | 4/1968 | McEwen et al. | 179—5 |
| 3,390,234 | 6/1968 | Glidden | 179—5 |
| 3,427,401 | 2/1969 | Waddell | 179—5 |

WILLIAM C. COOPER, Primary Examiner

A. B. KIMBALL, Jr., Assistant Examiner

U.S. Cl. X.R.

179—90